US011493489B2

(12) United States Patent
Widehammar et al.

(10) Patent No.: US 11,493,489 B2
(45) Date of Patent: Nov. 8, 2022

(54) APPARATUS, METHOD, AND COMPUTER PROGRAM PRODUCT FOR ADAPTING A PREDEFINED LIQUID CHROMATOGRAPHY PROCESS

(71) Applicant: Cytiva Sweden AB, Uppsala (SE)

(72) Inventors: Jens Widehammar, Uppsala (SE); Key Hyckenberg, Uppsala (SE); Orjan Grelsson, Uppsala (SE); Lars Mattsson, Uppsala (SE); Kjell Karlsson, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 92 days.

(21) Appl. No.: 16/975,324

(22) PCT Filed: Feb. 20, 2019

(86) PCT No.: PCT/EP2019/054188
§ 371 (c)(1),
(2) Date: Aug. 24, 2020

(87) PCT Pub. No.: WO2019/166294
PCT Pub. Date: Sep. 6, 2019

(65) Prior Publication Data
US 2021/0239662 A1    Aug. 5, 2021

(30) Foreign Application Priority Data
Feb. 27, 2018   (GB) ..................................... 1803129

(51) Int. Cl.
*G01N 30/86*     (2006.01)
*G01N 30/02*     (2006.01)
(52) U.S. Cl.
CPC ... *G01N 30/8658* (2013.01); *G01N 2030/027* (2013.01)

(58) Field of Classification Search
CPC .................... G01N 30/8658; G01N 2030/027
See application file for complete search history.

(56) References Cited

U.S. PATENT DOCUMENTS 4,824,446 A  *  4/1989  Mowery, Jr. ....... G01N 30/8693
                                              95/82
5,039,409 A     8/1991  Blaffert et al.
(Continued)

FOREIGN PATENT DOCUMENTS

EP    2124047 A1   11/2009
JP    H0552835 A    3/1993
(Continued)

OTHER PUBLICATIONS

Great Britain Search Report for GB Application No. 1905886.6 dated Oct. 23, 2019 (4 pages).
(Continued)

*Primary Examiner* — David J Bolduc
(74) *Attorney, Agent, or Firm* — Eversheds Sutherland (US) LLP

(57) ABSTRACT

The present invention relates to a liquid chromatography system (90) configured to operate with at least one column and configured for purification of a sample comprising a target product using a predefined process. The liquid chromatography system comprises a controller (91) configured to: control the operation of the chromatography system to run the predefined process; retrieve column data accessible from a data storage, the column data being specific to each column; and adapt at least one process parameter of the predefined process for each column based on column data. Whereby the predefined process is adapted to each column to obtain the target product and maintain the performance of the liquid chromatography system.

23 Claims, 8 Drawing Sheets

(56) References Cited

U.S. PATENT DOCUMENTS

| | | | |
|---|---|---|---|
| 5,892,458 A | | 4/1999 | Anderer et al. |
| 5,970,425 A | * | 10/1999 | Ono .................. G01N 30/88 |
| | | | 702/183 |
| 6,036,747 A | | 3/2000 | Blumberg et al. |
| 6,613,224 B1 | * | 9/2003 | Strand ............... G01N 30/6091 |
| | | | 210/656 |
| 8,410,928 B2 | | 4/2013 | Ganguly et al. |
| 8,568,586 B2 | | 10/2013 | Cunnien et al. |
| 2005/0247625 A1 | * | 11/2005 | Liu .................... B01D 15/166 |
| | | | 210/101 |
| 2006/0219633 A1 | * | 10/2006 | Horsman ............ B01D 15/166 |
| | | | 210/635 |
| 2011/0077766 A1 | | 3/2011 | Karlsson et al. |
| 2012/0203531 A1 | * | 8/2012 | Bisschops .......... G01N 30/8693 |
| | | | 703/11 |
| 2012/0222470 A1 | * | 9/2012 | Suzuki ............... G01N 30/8665 |
| | | | 73/61.56 |
| 2013/0061941 A1 | | 3/2013 | Gebauer |
| 2013/0206653 A1 | * | 8/2013 | Brann ................. B01L 3/545 |
| | | | 210/198.2 |
| 2014/0166557 A1 | | 6/2014 | Horsman et al. |
| 2016/0139095 A1 | * | 5/2016 | Gerhardt ............ G01N 30/8665 |
| | | | 73/1.02 |
| 2019/0041368 A1 | * | 2/2019 | Nakama .............. G01N 30/32 |
| 2019/0145943 A1 | * | 5/2019 | Ito ..................... G01N 30/8651 |
| | | | 703/9 |
| 2019/0346412 A1 | | 11/2019 | Hyckenberg et al. |

FOREIGN PATENT DOCUMENTS

| | | |
|---|---|---|
| WO | 2010/025777 A1 | 11/2010 |
| WO | 2011/046936 A1 | 4/2011 |
| WO | 2017149450 A3 | 9/2017 |

OTHER PUBLICATIONS

International Search Report and Written Opinion for PCT Application No. EP2020/060651 dated Jul. 1, 2020 (17 pages).
GE Healthcare: "Application note 28-9372-87 AA—Chromatography columns", Jan. 1, 2013, XP055787555, Retrieved from the Internet: URL:http://www.processdevelopmentforum.com/files/tips/28937207AA1.pdf.
Gritti, F. et al., "A Stochastic View on Column Efficiency", Journal of Chromatography A, 2018, 1540 (9), 55-67.
Avery, N.C. et al. "Re-Packing Reversed-Phase High-Performance Liquid Chromatography Columns as Means of Regenerating Column Efficiency and Prolonging Packing Life", Journal of Chromatography A, 1985, 328, 347-352.
PCT International Search Report and Written Opinion for PCT Application No. PCT/EP2019/054188 dated Aug. 12, 2019 (17 pages).
Great Britain Combined Search and Examination for GB Application No. 1803129.4 dated Aug. 28, 2018 (3 pages).
Garcia-Lavandeira et al., "Computer-Assisted Transfer of Programmed Elutions in Reversed-Phase high-Performance Liquid Chromatography," Journal of Chromatography A, 2006, 1128:17-26.

* cited by examiner

APPARATUS, METHOD, AND COMPUTER PROGRAM PRODUCT FOR ADAPTING A PREDEFINED LIQUID CHROMATOGRAPHY PROCESS

CROSS REFERENCE TO RELATED APPLICATIONS

This application claims the priority benefit of PCT/EP2019/054188 filed on Feb. 20, 2019, which claims priority to Great Britain Application No. 1803129.4 filed on Feb. 28, 2018, the entire contents of which are hereby incorporated by reference herein.

TECHNICAL FIELD

The present invention relates to a method in a liquid chromatography system configured to operate with at least one column for purification of a sample comprising a target product when feeding the liquid chromatography system with the sample.

BACKGROUND

An important factor in process chromatography is the binding capacity of a chromatography column for the solute. The binding capacity directly influences the productivity and cost of the chromatography step. The binding capacity is defined either in terms of dynamic/breakthrough capacity or as the maximum binding capacity. The dynamic capacity depends on the conditions at which the solution flows through a column packed with chromatography medium, and may be represented as a ratio between column volume and feed flow rate, a so-called residence time. The maximum binding capacity represents a breakthrough capacity of the column if the residence time was infinitely long.

When validating a process used in a chromatography system, having a single or several chromatography columns, it is essential that the result from the process is predictable and can be repeated without deviating from the process specification. For a single column system, when changing the column it is essential that the properties of the new column is of the same type and operates in the same way, i.e. columns having identical, or almost identical, properties are required to achieve the desired result in the validated process.

In continuous chromatography, several columns are connected in an arrangement that allows columns to be operated in series and/or in parallel, depending on the method requirements. Thus, all columns can be run in principle simultaneously, but with slightly shifted method steps. The procedure can be repeated, so that each column is loaded, eluted, and regenerated several times in the process. Compared to 'conventional' chromatography, wherein a single chromatography cycle is based on several consecutive steps, such as: load the sample, wash, elution, strip, Clean-In-Place (CIP) and re-equilibration, before the column may be used for another batch, in continuous chromatography based on multiple columns all these steps occur simultaneously but on different columns each.

In order to achieve optimal results, the columns in continuous chromatography have to be identical, or almost identical. The same applies when replacing the column a single chromatography column that is used in a validated process. If the column performance differs too much, the process will operate outside the validated performance range.

Continuous chromatography is an example of periodic counter current process, because periodically all the chromatography columns comprising the system are simultaneously moved in the direction opposite to the sample flow. The apparent movement of the columns is realized by appropriate redirections of inlet and outlet stream to/from the columns.

Historically, essential factors for a reliable continuous process are:
1) the quality of the columns used, and more specifically the similarity or even identity between columns,
2) constant feed composition, and
3) hardware reliance, for instance constant flow rate delivered by pumps, valve functionality, etc.

If the columns are not identical, the theoretical calculations typically used to design continuous chromatography process will not be correct, and it will become difficult to design an efficient and robust continuous chromatography process. The same argument applies if feed concentration and flow rates vary with time in an unexpected manner.

Therefore, for scale-up considerations, having identical columns, reliable pumps in the system is essential. However, the packing of a column with a chromatography medium is very complex in order to obtain repeatable results. Even small differences in the number of plates or other packing properties can have a huge effect on the end result. Furthermore, since capacities of chromatography resins typically change during resins lifetime/usage, the process conditions chosen for a fresh resin/medium may not be applicable for a resin that has been used for several times. If also the feed solution concentration will vary, it will be even more complicated to design an efficient continuous chromatography process that would operate at its optimum all the time.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

The object is achieved by a liquid chromatography system configured to operate with at least one column and configured for purification of a sample comprising a target product using a predefined process. The liquid chromatography system comprises a controller configured to:
control the operation of the chromatography system to run the predefined process,
retrieve column data accessible from a data storage, the column data being specific to each column, and
adapt at least one process parameter of the predefined process for each column based on column data,
whereby the predefined process is adapted to each column to obtain the target product and maintain the performance of the liquid chromatography system.

An advantage is that a more stable and repeatable result is obtained from a liquid chromatography process, since process parameters may be adapted to compensate for production variations when producing each column.

Further objects and advantages may be obtained from the detailed description by a skilled person in the art.

DETAILED DESCRIPTION

A chromatography system is designed for purification of target products (such as proteins, biomolecules from cell culture/fermentation, natural extracts) using at least one packed column of resin, to create a purification step. Each column is switched between loading and non-loading steps, such as wash and elution.

Figure 1:
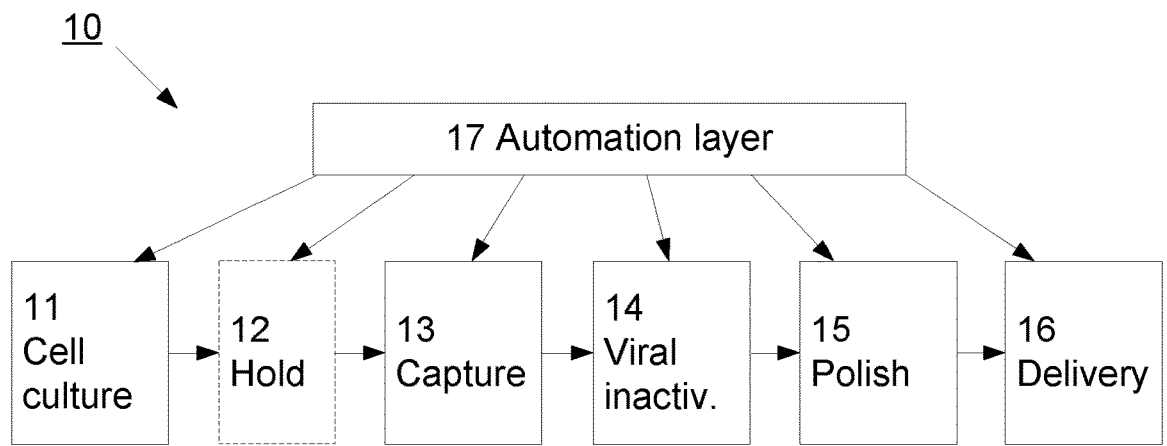
FIG. 1 illustrates an overview of a bioprocess purification system designed to purify a target product using liquid chromatography.

In FIG. 1, an overview of a bioprocess purification system 10, configured to purify a target product using a separation process is shown. The bioprocess purification system comprises a number of steps related to Cell culture 11, Hold 12, Capture 13, Viral inactivation 14, Polish 15 and Delivery 16.

The cell culture step 11 may be a perfusion type culture which comprises continuous addition of nutrients for cell growth in perfusion culture and continuous removal of product and waste through drain and filtration, e.g. using an Alternate Tangential Filtration (ATF) filter setup. The step may comprise process control for viable cell density (VCD), and the next step in the process starts when VCD reaches a pre-determined value. The VCD may be controlled by adapting the components of the cell culture media fed to the culture or by addition of certain components directly to the culture. Alternatively, the cell culture is of batch type.

The sample containing the target product is exploited in a cell free extraction process, e.g. by filtration, centrifugation or another technique.

The hold step 12 is an optional step depending on process needs, e.g. if a filter is in-line before capture step 13. The step may comprise process control on weight, and the next step in the process starts when a pre-determined volume value is reached, or alternatively after a certain time period or when a pre-determined mass is reached. The hold step may be used both for collecting a volume of filtered feed from a perfusion cell culture or from a batch culture.

Figure 2:
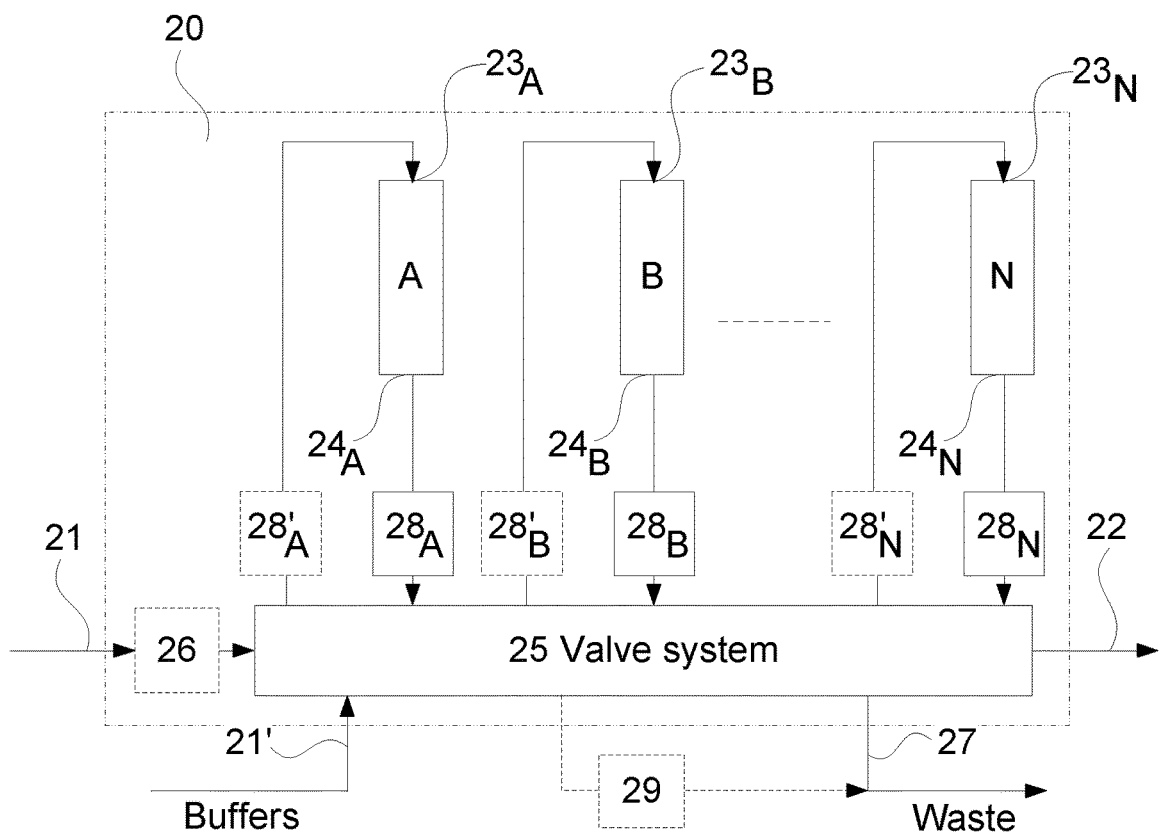
FIG. 2 illustrates a continuous chromatography with an arbitrary number of columns, based on a simulated moving bed technology.

The capture step 13 comprises at least one chromatography column that may have a filter in-line before the capture step. The capture step 13 may comprise a continuous chromatography setup, as illustrated in FIG. 2, which may be run e.g. as periodic counter current chromatography with a continuous feed of sample from the cell culture step 11, directly or via the hold step 12, containing the target product. The capture step comprises one or more batch elutions, and process control using in-line UV-sensors handles variation in feed concentration and resin capacity. The next step starts when a pre-determined amount value (e.g. volume, mass or time) is reached.

In the viral inactivation step 14, different options for virus inactivation is available depending on process needs. One option is to use batch mode with low pH for 30-60 minutes in a hold up tank. The step may comprise process control on volume, time, temperature and pH. The next step starts when a pre-determined time is reached.

The polish step 15 may be straight through processing (STP) with a connected batch step or continuous chromatography with a continuous load step, or a combination thereof. The flow rate is adjusted to a perfusion rate required by producer cells, which means that the flow rate is determined by the preceding step. The step may comprise process control for UV, flow and volume, and the next step starts when a pre-determined volume and amount is reached, alternatively when a timeout is reached.

The delivery step 16 may comprise a virus removal step, e.g. a viral filter, before an ultra-filtration step. The delivery step may be used as concentration step for batch addition of sample from polish step. The delivery step may comprise continuous or batch delivery of product and may comprise continuous or batch removal of waste. The step may comprise process control for pH, conductivity, absorbance, volume and pressure, and delivery is achieved when a pre-determined product concentration in a pre-defined environment is reached.

An automation layer 17 is used for handling decision points for the next step in the process. Different types of sensors (not shown), both in-line sensors and off-line sensors, are integrated into the process flow to monitor different parameters that may be used for providing the automation layer 17 with data that could be used to handle the decision points. Sensors include but are not limited to only measure flow, VCD, weight, pressure, UV, volume, pH, conductivity, absorbance, etc.

It should be noted that UV absorption is an example of a parameter that could be monitored to detect the composition of the sample being purified. However, other parameters may be used operating in other frequency ranges, such as IR, fluorescence, x-rays, etc.

Figure 4:
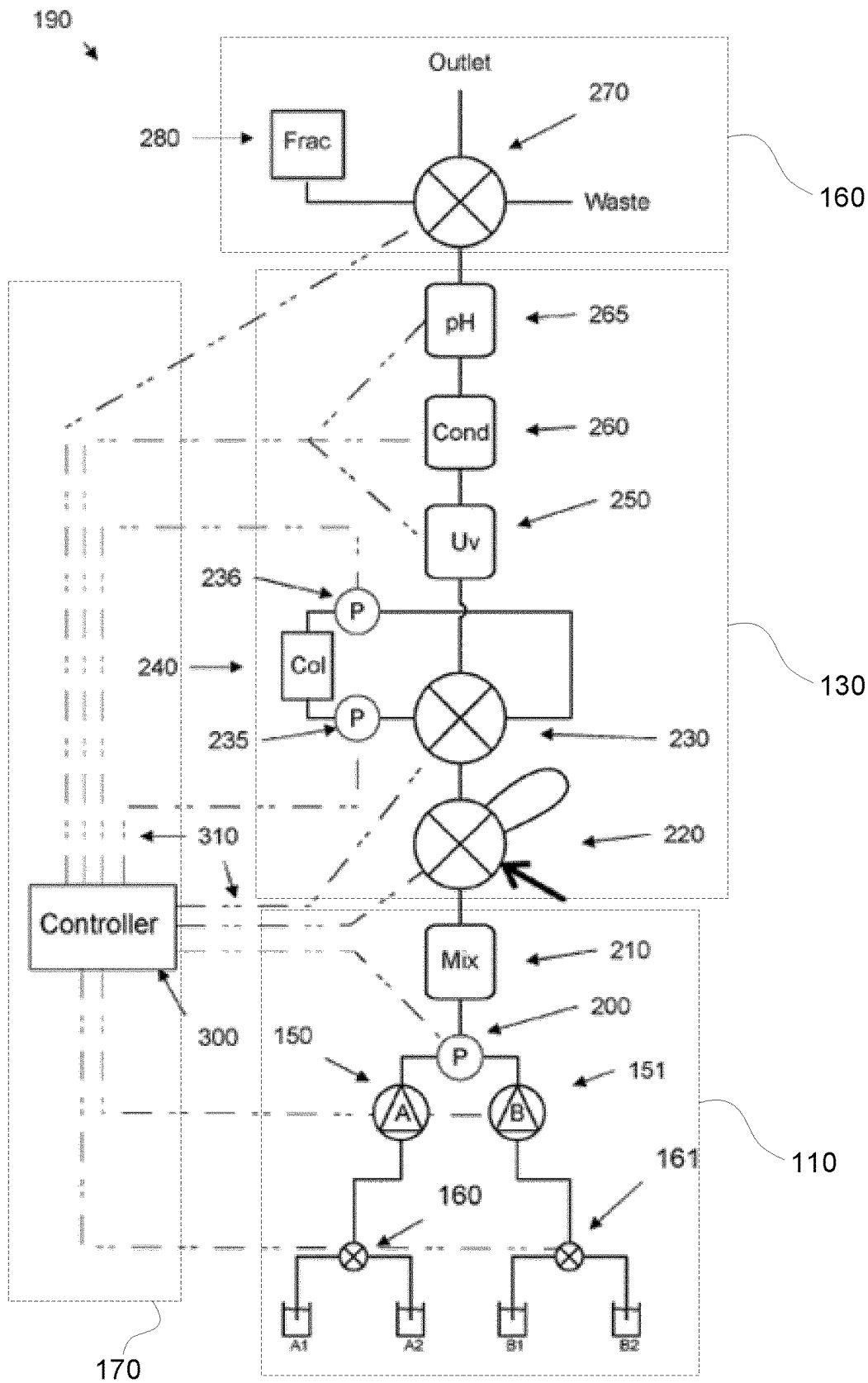
FIG. 4 illustrates a single column liquid chromatography system.

The capture step 13 may comprise a continuous chromatography setup 20, as illustrated in FIG. 2, or a single column 240, as illustrated in FIG. 4. Continuous chromatography supports process intensification by reducing footprint and improving productivity. In addition, continuous chromatography is especially suited for purification of unstable molecules, as the short process time helps to ensure stability of the target product.

In FIG. 2, sample containing the target product is fed into the continuous chromatography 20 via inlet 21 and the eluted target product is available at outlet 22. The continuous chromatography 20 comprises multiple columns A, B, N, and each column is provided with a column inlet 23 and column outlet 24. The column inlet 23 and column outlet 24 of each column is connected to a valve system 25 configured to connect the columns cyclically to the inlet 21 and the outlet 22 to achieve continuous purification of the target product. Example of a system configuration having three columns is described in connection with FIG. 3a-3c.

The continuous chromatography 20 is further provided with buffer inlet 26 and waste outlet 27 in order to be able to perform the required operations. An in-line sensor 28 may be provided after the column outlet 24 of each column or be assigned to the process flow and integrated into the valve system 25. Important parameters, such as UV, are measured to control the process, as described below. Another in-line sensor 28' may be provided before the column inlet 23 of each column in order to be able to directly evaluate performance of each column. An in-line inlet sensor 26 may also be provided to monitor the composition of the sample fed into the continuous chromatography 20.

The continuous chromatography may also comprise off-line sensors 29, which are designed to extract material from the process and thereafter evaluate selected parameters before the material is disposed of as waste.

The continuous chromatography comprises at least two, such as at least three, columns and the principle of operations in a three columns (3C) setup is described in connection with FIGS. 3a-3c. The 3C setup features two parallel flows: one for loading of the two columns in the loading zone, and one for the non-loading steps, e.g. elution and regeneration of the third column.

Figure 3A:
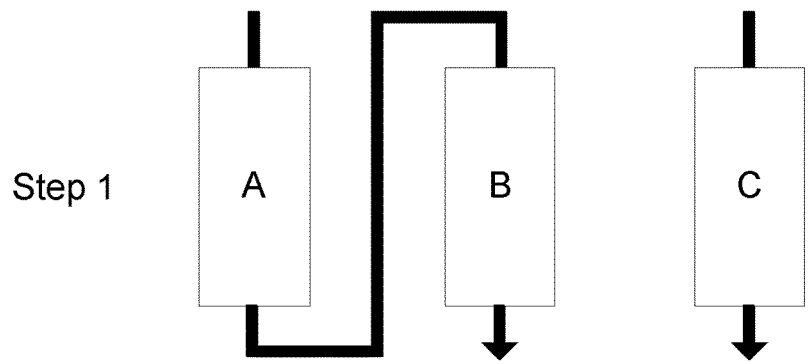
FIGS. 3a-3c illustrate the principle of three column chromatography.

In FIG. 3a, illustrating step 1, columns A and B are in the loading zone. Column A can be overloaded without sample loss, as column B catches the breakthrough from column A. In this way, the utilization of the resin binding capacity is maximized.

Figure 3B:
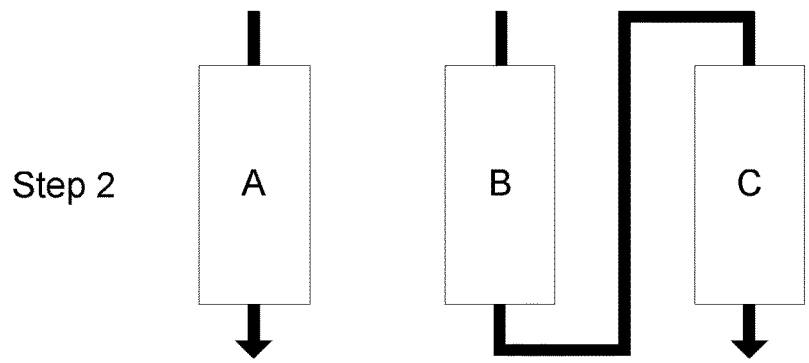

In FIG. 3b, illustrating step 2, the overloaded column A is switched and column B becomes the first column and column C becomes the second column in the loading zone. The overloaded column A will now be subjected to the non-loading steps, such as elution and regeneration in a parallel workflow.

Figure 3C:
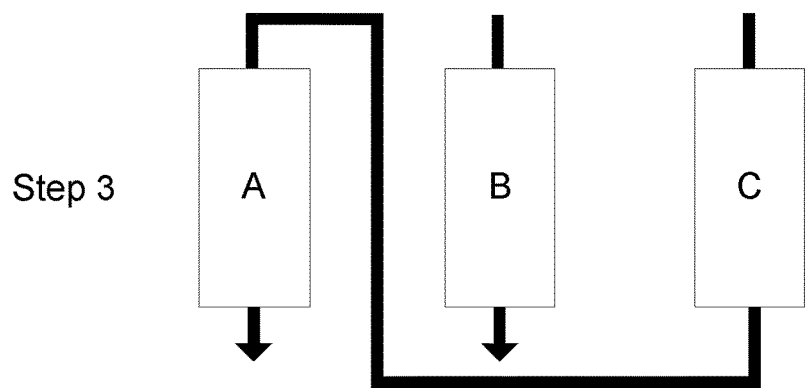

In FIG. 3c, illustrating step 3, the overloaded column B in the loading zone is switched. Now column C becomes the first column and column A the second column in the loading zone, while column B is subjected to elution and regeneration in the parallel workflow. These three steps are repeated in a cyclic manner until required target product volume, mass or amount is reached (or until resin lifetime is reached and columns needs to be repacked or exchanged).

The continuous chromatography setup illustrated in FIG. 2 may utilize more than three columns, and in a four column (4C) setup, the same principle applies. However, the non-loading steps can become limiting in a 3C setup, and the non-loading steps can be split on two columns and run in parallel utilizing a third flow path in the 4C setup. The 4C setup allows for balancing the loading and non-loading steps. More columns will lead to a more flexible system, while the complexity of the valve system 25 becomes increasingly complicated. However, some continuous chromatography have sixteen or more columns.

FIG. 4 schematically shows one embodiment of a chromatography system 190 comprising two 3-way input-valves 160 and 161, arranged to select the input fluid from fluid sources AI, A2, BI, B2 for two system pumps 150 and 151. The chromatography system 190 may further comprise:
  a pressure sensor 200 for registering the system pressure in the flow path after the system pumps, and
  a mixer 210 to ensure appropriate mixing of the fluids supplied by the pumps.

These correspond to the cell culture block 11 illustrated in FIG. 1, as indicated by the dashed lines 110.

The system further comprises:
  an injection valve 220 for injecting a sample into the fluid path,
  a column connection valve 230 for selectively connecting/disconnecting a column 240 in the fluid path.
  a pre-column pressure sensor 235 and a post-column pressure sensor 236
  an ultraviolet (UV) monitor 250 for detecting the output from the column.
  a conductivity monitor 260, and
  a pH monitor 265.

These correspond to the capture block 13 illustrated in FIG. 1, as indicated by the dashed lines 130.

The system further comprises:
  an output selection valve 270 with two or more output positions, e.g. connected to a fraction collector 280, a waste receptacle or the like, which correspond to delivery block 16 in FIG. 1, as indicated by dashed lines 160, and
  a system controller 300 connected to pumps and valves for controlling the liquid flow through the system, and to sensors and monitors for monitoring the flow, connections being illustrated by dotted lines 310, which correspond to Automation block 17 in FIG. 1, as indicated by dashed lines 170.

The chromatography system of FIG. 4 represents a general example of how a single column chromatography system may be designed, and other embodiments may be of different design comprising two or more of some components and potentially lack some of the components. E.g. components corresponding to Hold 12, Viral inactivation 14 and polish 15 as illustrated in FIG. 1.

Figure 5:
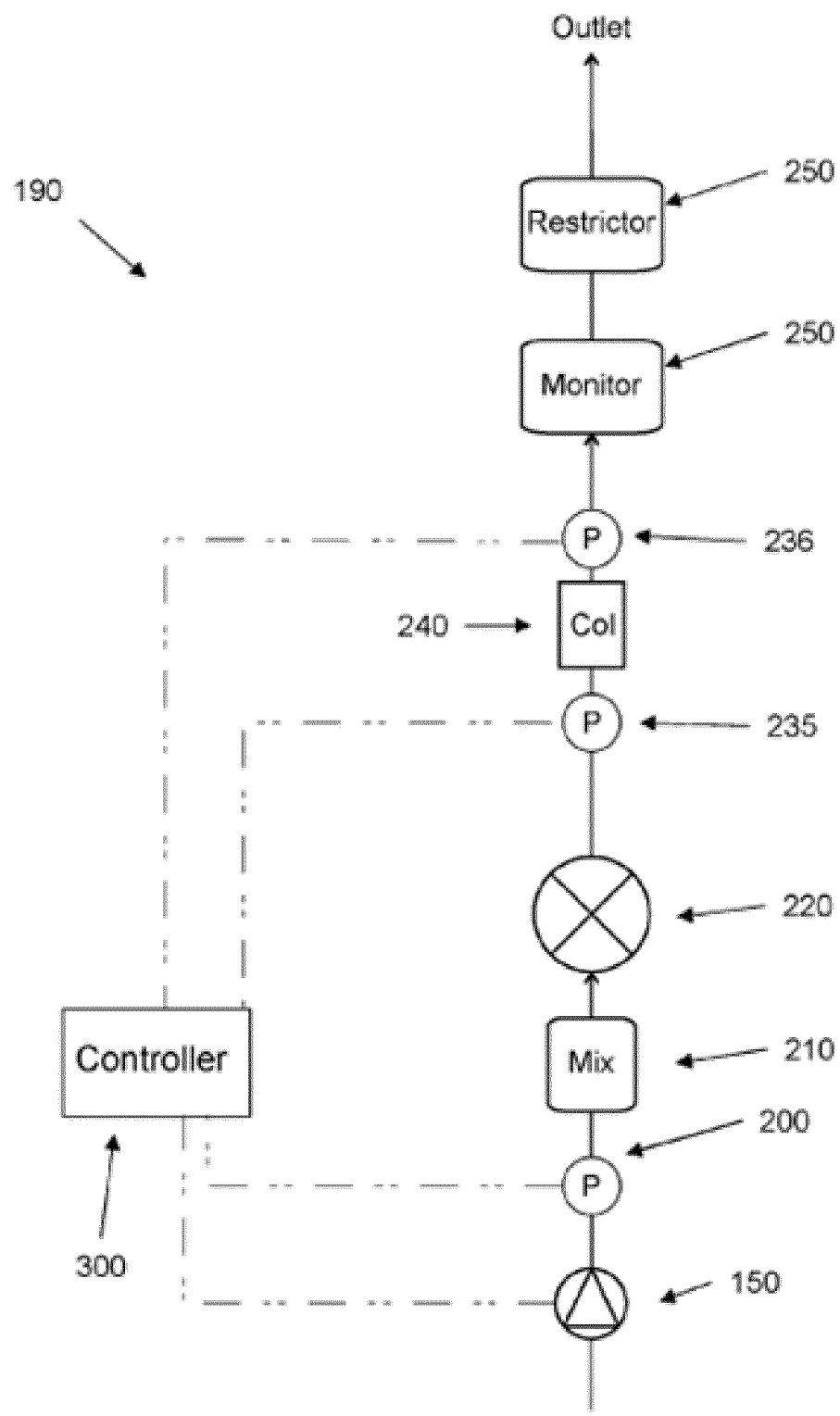
FIG. 5 illustrates a simplified flow chart for the liquid chromatography system in FIG. 4 with pressure sensors.

FIG. 5 is a simplified flow chart for a liquid chromatography system 190 according to FIG. 4. In FIG. 5 the flow path has been straightened out and some components have been removed to achieve a more simplistic view. In FIG. 5 the system controller is shown connected only to the pump 150, the pressure sensor 200, the pre-column pressure sensor 235 and the post-column pressure sensor 236, but it may be connected to other components as discussed above. In FIG. 5, the system comprises both the pre-column pressure sensor 235 and the post-column pressure sensor 236, whereby the column pressure is directly measured by the pre-column sensor 235, and the delta-column pressure by subtracting the pressure registered by the post-column sensor 236 from the column-pressure.

Figure 6:
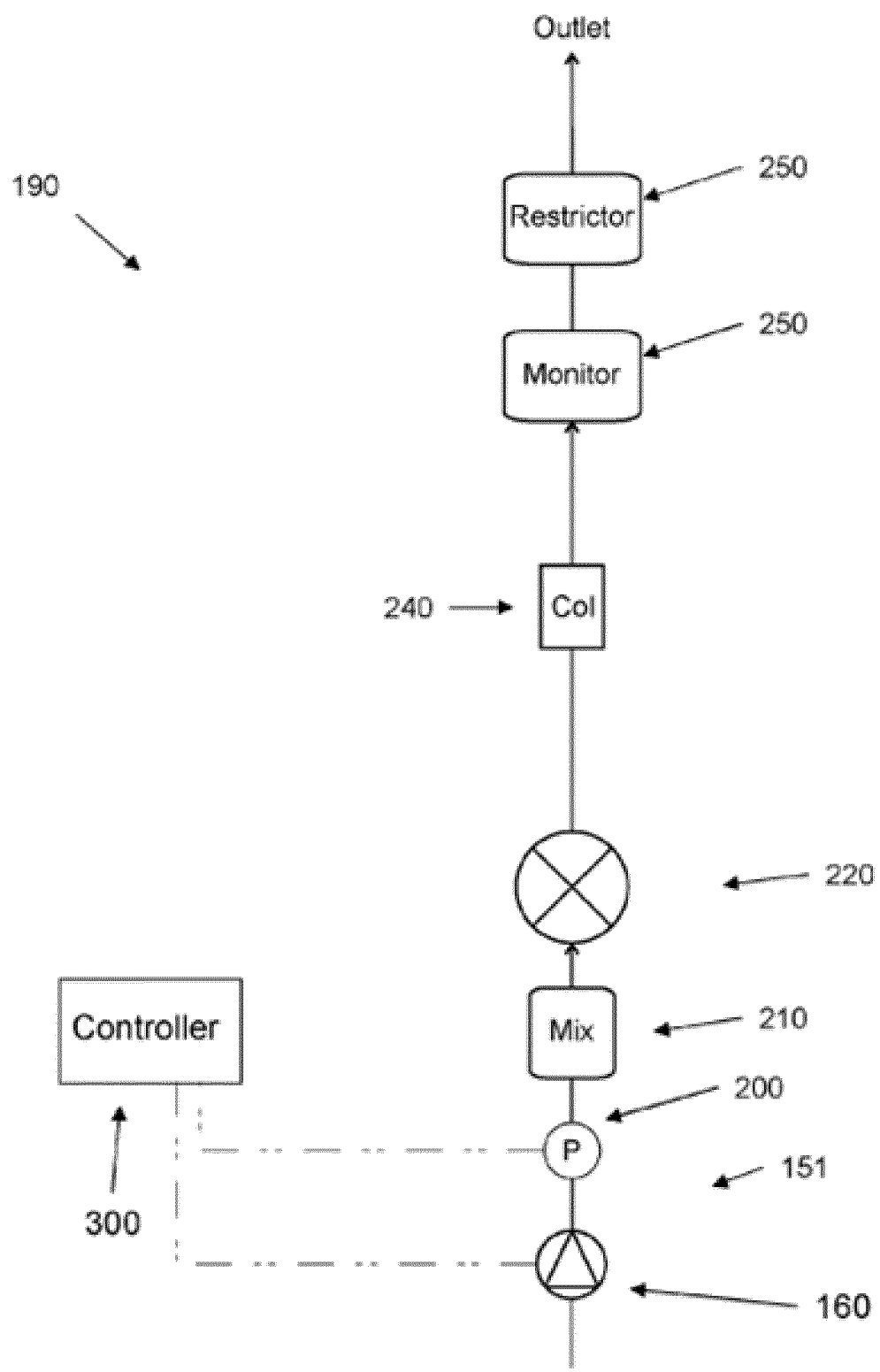
FIG. 6 illustrates a simplified flow chart for the liquid chromatography system in FIG. 4 with only a system pressure sensor.
Figure 7:
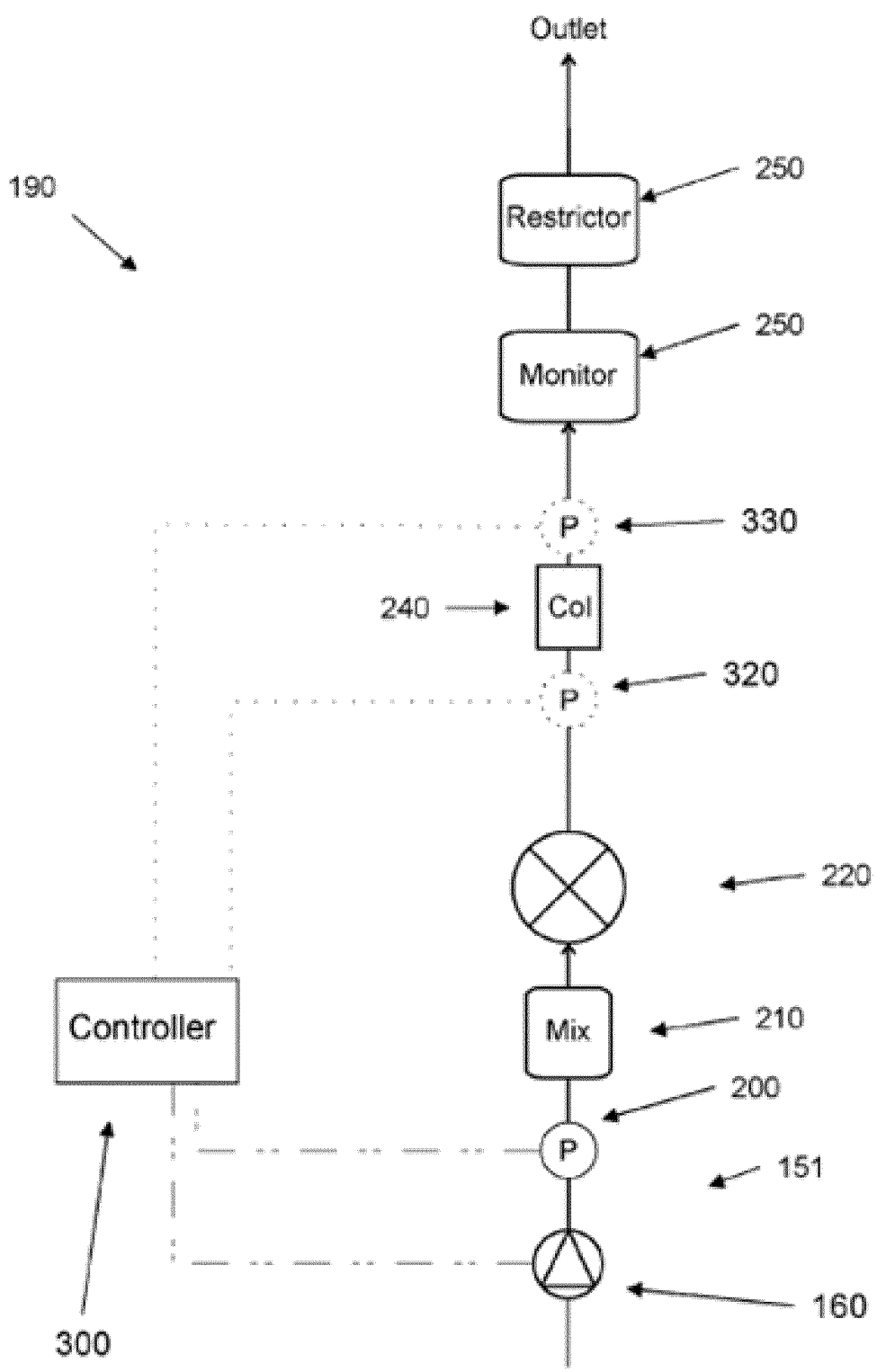
FIG. 7 illustrates a simplified flow chart for the liquid chromatography system in FIG. 4 with a virtual pressure sensor.

As briefly mentioned above, some systems do not have other pressure sensors than the system pressure sensor 200. FIG. 6 is a simplified flow chart of such a liquid chromatography system 190 with one single pressure sensor 200 for registering the system pressure. As mentioned above, the pressure control in such a system only relies on the registered system pressure, by sensor 200. FIG. 7 is a simplified flow chart of a liquid chromatography system according to one embodiment of the present invention, wherein the controller 300 is arranged to estimate the pre-column pressure based on the registered system pressure, the characteristics of the flow path, and the viscosity and flow-rate of the liquid in the system. The estimated pre-column pressure may be referred to as a "virtual pressure sensor" schematically shown in FIG. 7 by faint dotted lines.

According to one embodiment, the calculation of the virtual pressure signal may be based on Bernoulli's formula for pressure drop in a flow channel.

$$\text{Flow channel}\Delta P[\text{MPa}]=0.000000000679*L*Q*V/D<4> \text{ where}$$

L=length [mm]
D=diameter [mm]
Q=flow rate [ ml/min]
V=viscosity [cP]

By providing length and diameter of the flow path, and the viscosity of the liquid in the system, to the system controller, it may be arranged to calculate the pressure drop caused by the flow path up to the column at the current flow rate. In some systems, the length and size of the flow path between the system pressure sensor 200 and the column 240, may be standardized, so that the predefined parameters may be used for the calculations. In other systems, (which is the most common situation), the flow path between components in the chromatography system is user defined, whereby a user of the system has to enter the parameters using by a user interface.

According to one embodiment, the major part of the flow path between the system pressure sensor 200 and the column 240 may be comprised of capillary tubing of the same diameter, then the flow path characteristics may be estimated as the total length of the tubing, thus excluding contributions from other components, like valves or the like from the calculations. In other embodiments, the contribution from valves or the like in the flow path are taken into consideration and may be system defined, whereas, tubing or the like is user defined. It should be noted that, in case the flow path comprises sections of different size (e.g. tubing of different inner diameter), the pressure drop over each section has to be calculated individually and eventually added together to provide the total pressure drop.

When the pressure drop in the flow path up to the column 240 is estimated by the above calculations, the virtual Pre-column pressure is calculated by subtracting the pressure drop from the system pressure registered by system pressure sensor 200.

EXAMPLE

If System pressure is 5 bar and the calculated pressure drop over the flow path is 2 bar then the calculated virtual pre-column pressure is estimated to 3 bar.

All pressure contributions after the virtual pressure sensor will automatically be compensated for, since these will directly affect the measured system pressure. So, e.g. if a flow restrictor is added or removed, the measured System pressure will change as well as the calculated Pre-column pressure. Changes in the flow path between the System pressure sensor and the column must be taken care of in the estimation.

According to one embodiment, in case the viscosity is not known, the controller may assume that water is used whereby the viscosity can be estimated for different temperatures using a known expression like:

$$V[cP] = A \times 10^{B/(T-C)},$$

where T=temperature [K]; A=0.02414; B=247.8 K; C=140 K.

In the real situation there may be some factors that may affect the accuracy of the virtual pressure estimation. If the viscosity of the liquid is unknown and it is assumed to be water, but it has a higher viscosity, then the estimated value for flow path ΔP becomes too low. Then the calculated value for the virtual pressure signal becomes higher than the actual value whereby a pressure alarm will trigger before the actual pressure becomes too high for the column. This is also the case if other components in the flow path (mixer, valves etc.) generate some back pressure. Consequently, for liquids with viscosity lower than water, the estimation will give a virtual pre-column pressure that is lower than the actual pressure. However, such liquids are mostly used for high pressure columns where the high accuracy of the pressure signal is not required since most such column withstand higher pressures than they are normally used with. According to one embodiment, the system is arranged to estimate the delta-column pressure by using the same principles for the flow path after the column a virtual post-column pressure may be estimated and used to calculate a virtual delta-column pressure.

As mentioned, the virtual pre-column pressure and the delta-column pressure may be used to control the operation of the chromatography system, e.g. by monitoring the pressures with respect to predefined or user-defined pressure limits, or by running the chromatographic system at a predefined column pressure or the like.

The disclosure illustrates a chromatography process configured to operate with at least one column and configured for purification of a sample comprising a target product using a predefined process. The predefined process may be a generic process, a validated process or a special process, and can be predefined from the manufacturer or generated by the end-user.

Figure 9:
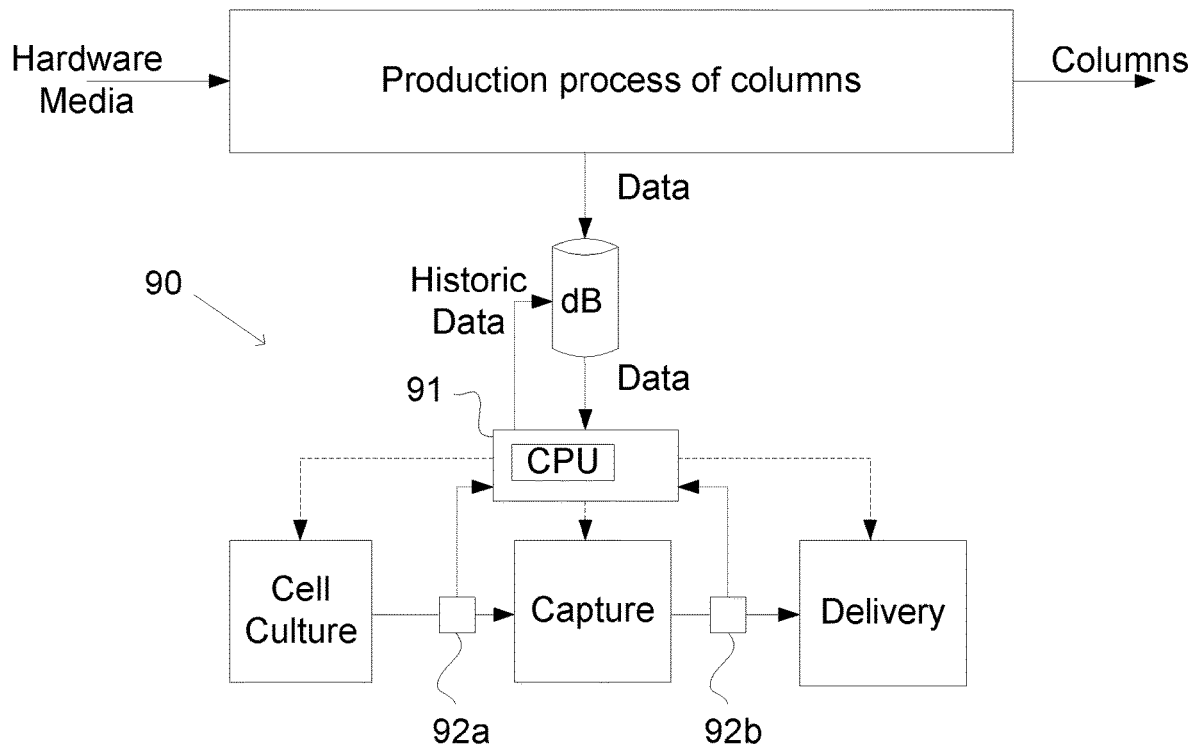
FIG. 9 illustrates data flow in a system adapted for manufacturing columns and a liquid chromatography system.

FIG. 9 illustrates data flow in a system adapted for manufacturing columns and a liquid chromatography system. As described in more detail below, column data is generated during manufacturing of columns and is stored in a database dB accessible to the chromatography system 90. Data flow is indicated by dotted lines, and control signals by dashed lines.

The liquid chromatography system comprises a controller 91 configured to control the operation of the chromatography system to run the predefined process, retrieve column data accessible from a data storage dB, the column data being specific to each column, and adapt at least one process parameter of the predefined process for each column based on column data, whereby the predefined process is adapted to each column to obtain the target product and maintain the performance of the liquid chromatography system.

The data storage may be a database (integrated in the chromatography system or accessible from a source outside the chromatography system, such as a cloud based implementation). Another alternative is to store column data on individual column, e.g. as a memory chip and communication with the chromatography system via RFID.

The process parameter comprises: pressure over each column, flow of sample into the column, flow of residue out from the column and/or processed volume of sample/time period (column volume/hour).

According to some embodiments, the liquid chromatography system is configured to operate with a single column for purification of the sample, and according to some embodiments the liquid chromatography system is configured to operate with at least three columns for continuous purification of the sample.

Figure 8:
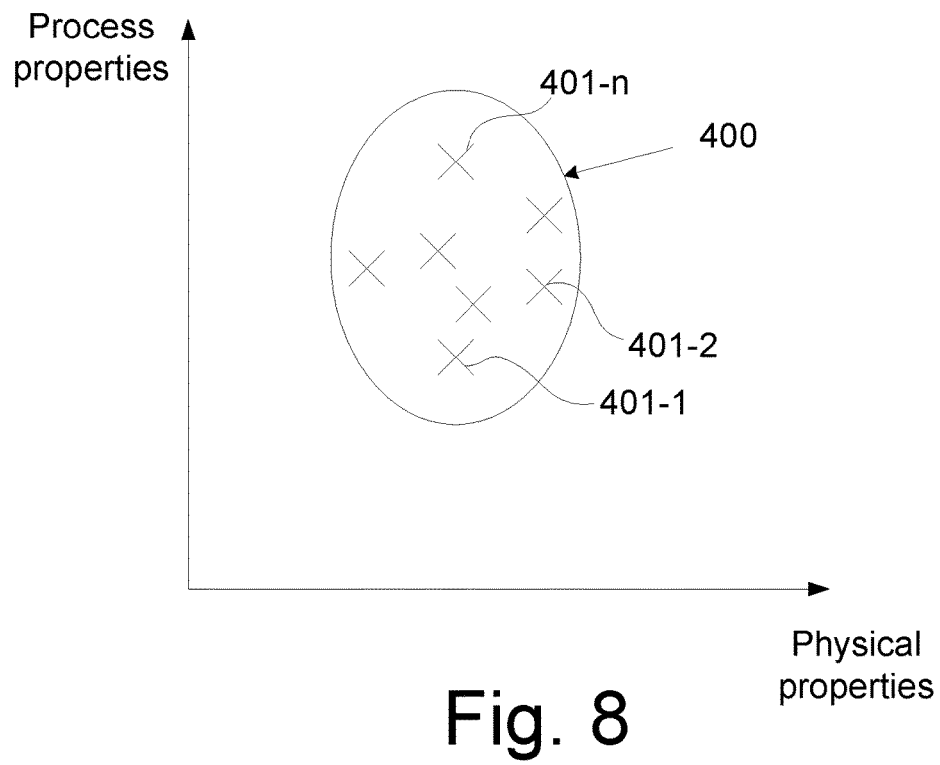
FIG. 8 illustrates the concept of assigning columns to a type.

FIG. 8 illustrates the concept of assigning the columns to a type 400 (also referred to as family). Each individual column 401-1, 401-2, 401-*n* belongs in this example to a specific type 400 having predetermined production parameters related to the column. In this example, the production parameters defines a range of different physical properties of the used column components and different process properties used to manufacture the column.

The column comprises a vessel for holding a resin and filters, and column components may include hardware specific properties, physical dimensions of the vessel (such as height of the vessel), material properties of the resin, such as grain size and distribution, physical properties of the filter, etc.

Process properties relates to the manufacturing process of the column, such as height of resin bed, pressure boundaries, flow specification, etc. The height of the resin bed may be the actual height or the height of the vessel.

The production parameters may further comprise actual volume of resin in each column.

In some example embodiments, the liquid chromatography system further comprises sensors 92a, 92b adapted to read sensor parameters, wherein the adaptation of the at least one process parameters further is based on sensor readings. In some embodiments, the sensor readings comprise any of: UV, Flow and Pressure.

In some embodiments. the production parameters further comprise actual volume of resin in each column.

The database, which is accessible by the system may comprise historic data for each individual column and/or columns belonging to the same specific type (i.e. the same family) previously used in the liquid chromatography system for purification of the sample. Historic data information from the controller is stored in the database for this purpose.

Figure 10:
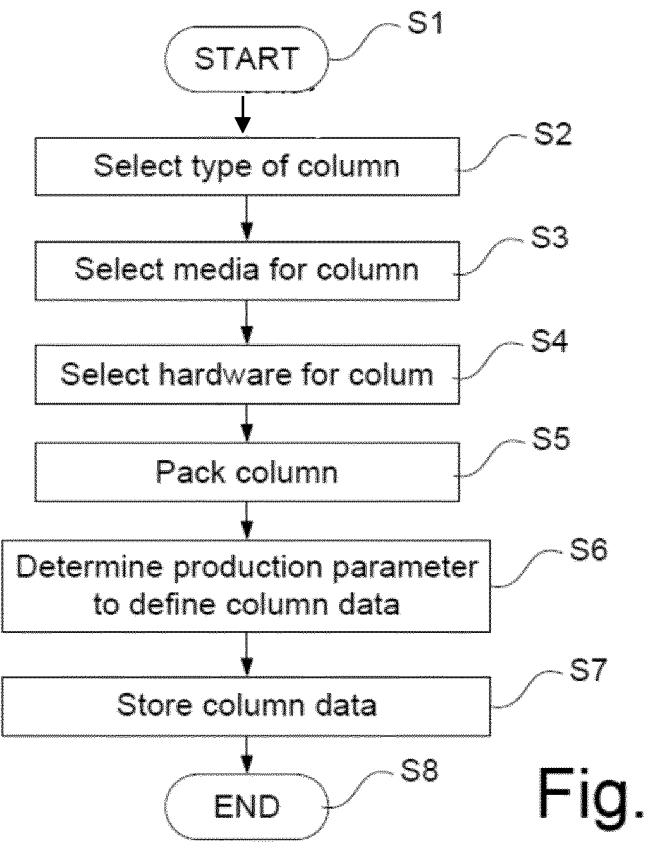
FIG. 10 is a flow chart illustrating a method for manufacturing a column for a liquid chromatography system.

FIG. 10 is a flow chart illustrating a method for manufacturing a column for a liquid chromatography system. The disclosure also comprises a method for manufacturing a column for a liquid chromatography system, the column having an inlet and an outlet and comprises a vessel for holding a resin. The method comprises:

1) Selecting, step S2, a type of column configured to be used in a process for purification of a sample comprising a target product.

2) Selecting, step S3, the resin (which is the media) based on the type of column, the resin having media properties. Media properties comprise measured and calculated properties of the media that is intended to be used in the column. The media parameters are affected by the media manufacturing process and tolerances of different media components used when manufacturing the media.

3) Selecting, step S4, the vessel (i.e. the hardware) for holding the resin, the vessel having hardware properties. Hardware properties comprise measured and calculated properties of the different components used to manufacture the column, that affects the function of the column, such as physical dimensions (with tolerances) and filter properties (if included).

4) Packing, step S5, the resin to form a resin bed in the vessel using a pressure based on the type of column to establish a height of the resin bed.

5) Determining production parameters, step S6, based on the media properties and the hardware properties to define column data for the column, and storing the column data in a data storage, which is accessible for the liquid chromatography system. The data storage may be integrated in the column or be a data base accessible to the chromatography system, as mentioned above.

In some examples, the column further comprises hardware in the form of a top filter arranged between the inlet and the resin bed, and the method further comprises selecting the top filter based on the type of column, the top filter having top filter properties, and determining production parameters based further on the top filter properties to define the column data.

In some examples the column further comprises hardware in the form of a bottom filter arranged between the outlet and the resin bed, and the method further comprises selecting the bottom filter based on the type of column, the bottom filter having bottom filter properties, and determining production parameters based further on the bottom filter properties to define the column data.

The disclosure also comprises a column for a liquid chromatography system, the column having an inlet and an outlet and comprises a vessel for holding a resin, wherein the column is manufactured according to the method mentioned above. A system for manufacturing the columns is illustrated in FIG. 9, where the output from the system is columns and column data, which is stored in a database dB accessible to the chromatography system.

In some examples, the column further comprises hardware in the form of a data storage, e.g. a data chip, configured to store column data, and a communication device configured to communicate the column data to the liquid chromatography system.

In some embodiments, the communication device is configured to communicate with the liquid chromatography system using RFID.

Figure 11:
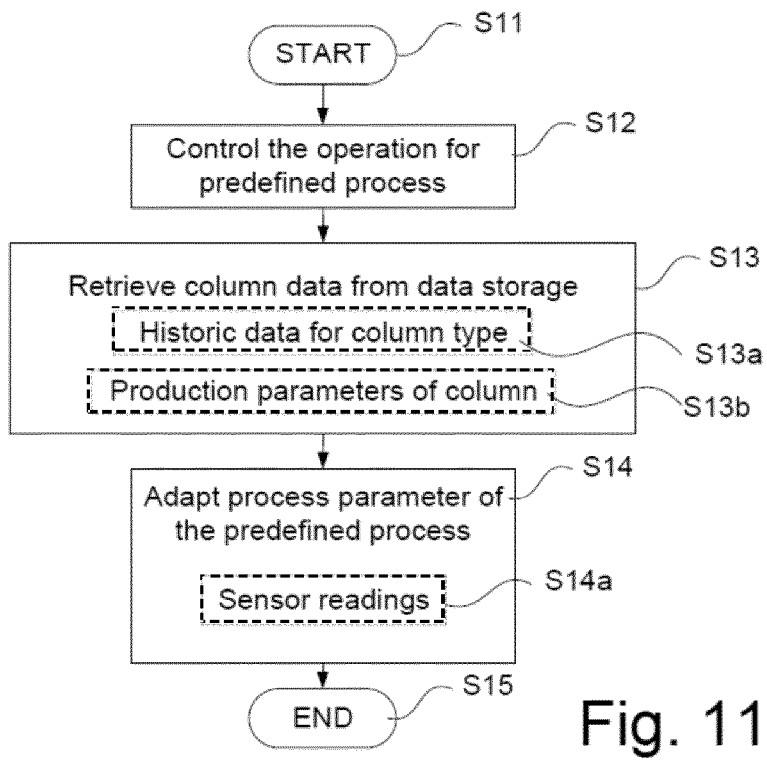
FIG. 11 is a flow chart illustrating a method for controlling a liquid chromatography system configured to operate with at least one column.

FIG. 11 is a flow chart illustrating a method for controlling a liquid chromatography system configured to operate with at least one column. The disclosure also comprises a method for controlling a liquid chromatography system configured to operate with at least one column and configured for purification of a sample comprising a target product using a predefined process, wherein the method comprises:

A) controlling, step S12, the operation of the chromatography system to run the predefined process.

B) retrieving column data, step S13, accessible from a data storage, the column data being specific to each column, and adapting, step S15, at least one process parameter of the predefined process for each column based on column data.

Whereby the predefined process is adapted to each column to obtain the target product and maintain the performance of the liquid chromatography system from a sample.

In some examples, each column is of a specific type and the data storage comprises historic data for each column and/or columns belonging to the same specific type previously used in the liquid chromatography system for purification of the sample, wherein the method comprises further adapting the at least one process parameter of the predefined process based on the historic data, step S13a.

In some examples, the data storage comprises column data related to production parameters when producing each column, the production parameters comprises, height of resin bed, pressure boundaries, flow specification, material properties, hardware specific properties, filter properties, and physical dimensions of the vessel, wherein the method comprises further adapting the at least one process parameter of the predefined process based on the production parameters, step S13b.

In some examples, the liquid chromatography system further comprises sensors adapted to read sensor parameters, wherein the method further comprises further adapting the at least one process parameters based on sensor readings, step S14a. The sensor readings may comprise any of: UV, Flow and Pressure.

The data storage may be selected to be a database, which may be integrated in the liquid chromatography system. An alternative is to integrate the data storage in each column.

The disclosure further comprises a computer program for controlling a liquid chromatography system, comprising instructions which, when executed on at least one processor, cause the at least one processor to carry out the method according to method mentioned above.

The disclosure further comprises a computer-readable storage medium carrying a computer program for controlling a liquid chromatography system as defined above.

The invention claimed is:

1. A liquid chromatography system configured to operate with at least one column and configured for purification of a sample comprising a target product using a predefined process, wherein the liquid chromatography system comprises a controller configured to:
   control the operation of the chromatography system to run the predefined process,
   retrieve column data accessible from a data storage, the column data being specific to each column, and
   adapt at least one process parameter of the predefined process for each column based on column data,
   whereby the controller comprises at least one virtual pressure sensor configured to adapt at least one process parameter of the predefined process for each column based on column data, and
   whereby the predefined process is adapted to each column to obtain the target product and maintain the performance of the liquid chromatography system.

2. The liquid chromatography system according to claim 1 configured to operate with a single column for purification of the sample.

3. The liquid chromatography system according to claim 1 configured to operate with at least three columns for continuous purification of the sample.

4. The liquid chromatography system according to claim 1, wherein each column is of a specific type and the data storage comprises historic data for each column and/or columns belonging to the same specific type previously used in the liquid chromatography system for purification of the sample, wherein the controller is configured to further adapt the at least one process parameter of the predefined process based on the historic data.

5. The liquid chromatography system according to claim 1, wherein the data storage comprises column data related to production parameters when producing each column.

6. The liquid chromatography system according to claim 5, wherein each column comprises a vessel for holding resin and the production parameters comprises, height of resin bed, pressure boundaries, flow specification, material properties, hardware specific properties, filter properties, and physical dimensions of the vessel.

7. The liquid chromatography system according to claim 6, wherein the height of the resin bed is the actual height or the height of the vessel.

8. The liquid chromatography system according to claim 1, further comprising sensors adapted to read sensor parameters, wherein the adaptation of the at least one process parameters further is based on sensor readings.

9. The liquid chromatography system according to claim 8, wherein sensor readings comprises any of: UV, Flow and Pressure.

10. The liquid chromatography system according to claim 5, wherein the production parameters further comprises actual volume of resin in each column.

11. The liquid chromatography system according to claim 1, wherein the data storage is a database.

12. The liquid chromatography system according to claim 11, wherein the database is integrated in the liquid chromatography system.

13. The liquid chromatography system according to claim 1, wherein the data storage is integrated in each column.

14. A method for controlling a liquid chromatography system configured to operate with at least one column and configured for purification of a sample comprising a target product using a predefined process, wherein the method comprises:
   controlling the operation of the chromatography system to run the predefined process,
   retrieving column data accessible from a data storage, the column data being specific to each column, and
   adapting at least one process parameter of the predefined process for each column based on column data,
   whereby the liquid chromatography system further comprises a virtual pressure sensor configured to adapt at least one process parameter of the predefined process for each column based on column data, and
   whereby the predefined process is adapted to each column to obtain the target product and maintain the performance of the liquid chromatography system.

15. The method according to claim 14, wherein each column is of a specific type and the data storage comprises historic data for each column and/or columns belonging to the same specific type previously used in the liquid chromatography system for purification of the sample, wherein the method comprises further adapting the at least one process parameter of the predefined process based on the historic data.

16. The method according to claim 14, wherein the data storage comprises column data related to production parameters when producing each column, the production parameters comprises, height of resin bed, pressure boundaries, flow specification, material properties, hardware specific properties, filter properties, and physical dimensions of a vessel, wherein the method comprises further adapting the at least one process parameter of the predefined process based on the production parameters.

17. The method according to claim 14, wherein the liquid chromatography system further comprises sensors adapted to read sensor parameters, wherein the method further comprises further adapting the at least one process parameters based on sensor readings.

18. The method according to claim 17, wherein the method further comprises selecting the sensor readings to comprise any of: UV, Flow and Pressure.

19. The method according to claim 14, wherein the data storage is selected to be a database.

20. The method according to claim 19, further comprising integrating the database in the liquid chromatography system.

21. The method according to claim 14, further comprising integrating the data storage in each column.

22. A computer program for controlling a liquid chromatography system, comprising instructions which, when executed on at least one processor, cause the at least one processor to carry out the method according to claim 14.

23. A computer-readable storage medium carrying a computer program for controlling a liquid chromatography system according to claim 22.

* * * * *